United States Patent [19]

Pierce

[11] Patent Number: 5,674,176
[45] Date of Patent: Oct. 7, 1997

[54] METHOD FOR TREATMENT OF SOLID WASTE TO MINIMIZE HEAVY METALS

[75] Inventor: Sherry Ann Pierce, Dallas, Tex.

[73] Assignee: Entact, Inc., Irving, Tex.

[21] Appl. No.: 726,622

[22] Filed: Oct. 7, 1996

Related U.S. Application Data

[63] Continuation of Ser. No. 389,356, Feb. 16, 1995, abandoned.

[51] Int. Cl.$^6$ .............................. A62D 3/00; B09B 3/00
[52] U.S. Cl. ........................ 588/256; 405/129; 588/901
[58] Field of Search .......................... 588/18, 252, 256, 588/257, 901; 405/128, 129; 106/697

[56] References Cited

U.S. PATENT DOCUMENTS

| | | |
|---|---|---|
| 3,094,846 | 6/1963 | Peeler, Jr. . |
| 3,837,872 | 9/1974 | Conner . |
| 3,962,080 | 6/1976 | Dunlin et al. . |
| 4,124,405 | 11/1978 | Quienot . |
| 4,142,912 | 3/1979 | Young .............................. 405/129 X |
| 4,268,188 | 5/1981 | Bertus et al. ........................... 405/128 |
| 4,354,942 | 10/1982 | Kaczur et al. ........................ 210/712 |
| 4,356,030 | 10/1982 | Halbin . |
| 4,518,508 | 5/1985 | Conner ................................ 210/751 |
| 4,547,290 | 10/1985 | Pichat ................................. 210/751 |
| 4,582,611 | 4/1986 | Wang .................................. 210/747 |
| 4,652,381 | 3/1987 | Inglis .................................. 210/724 |
| 4,671,882 | 6/1987 | Douglas et al. ........................ 210/720 |
| 4,687,373 | 8/1987 | Falk et al. ............................ 405/128 |
| 4,701,219 | 10/1987 | Bonee ............................... 405/129 X |
| 4,736,356 | 4/1988 | O'Hara et al. ..................... 210/912 X |
| 4,737,356 | 4/1988 | O'Hara et al. ........................ 588/256 |
| 4,761,182 | 8/1988 | Whitescarver et al. . |
| 4,764,284 | 8/1988 | Jansen ................................. 210/715 |
| 4,781,841 | 11/1988 | Someya ........................... 405/128 X |
| 4,861,482 | 8/1989 | Frankenberger, Jr. et al. .... 405/264 X |
| 4,878,944 | 11/1989 | Rolle et al. . |
| 4,889,640 | 12/1989 | Stanforth ............................. 210/751 |
| 4,927,293 | 5/1990 | Campbell ............................ 405/128 |
| 4,948,516 | 8/1990 | Fisher et al. ......................... 210/751 |
| 4,950,409 | 8/1990 | Stanforth ............................. 210/751 |
| 4,981,393 | 1/1991 | Vandevelde et al. ................. 405/128 |
| 4,988,376 | 1/1991 | Mason et al. . |
| 5,013,185 | 5/1991 | Taki .................................... 405/128 |
| 5,024,556 | 6/1991 | Timmerman ........................ 405/128 |
| 5,028,272 | 7/1991 | Bonee ............................. 405/129 X |
| 5,037,240 | 8/1991 | Sherman ............................. 405/128 |
| 5,037,479 | 8/1991 | Stanforth ............................. 106/691 |
| 5,061,119 | 10/1991 | Balthaus et al. ..................... 405/128 |
| 5,162,600 | 11/1992 | Cody et al. ...................... 588/256 X |
| 5,193,936 | 3/1993 | Pal et al. ............................. 405/128 |
| 5,202,033 | 4/1993 | Stanforth et al. .................. 588/256 X |

*Primary Examiner*—George A. Suchfield
*Attorney, Agent, or Firm*—Warren & Perez

[57] ABSTRACT

This invention relates to the treatment of contaminated materials including soils and solids, and in particular to chemical treatment of waste or solids containing high levels of heavy metals such as lead, by treating the waste or solid with an additive from the group consisting of phosphoric acid, monocalcium phosphate monammonium phosphate and diammonium phosphate either alone or in combination with Portland cement.

8 Claims, 2 Drawing Sheets

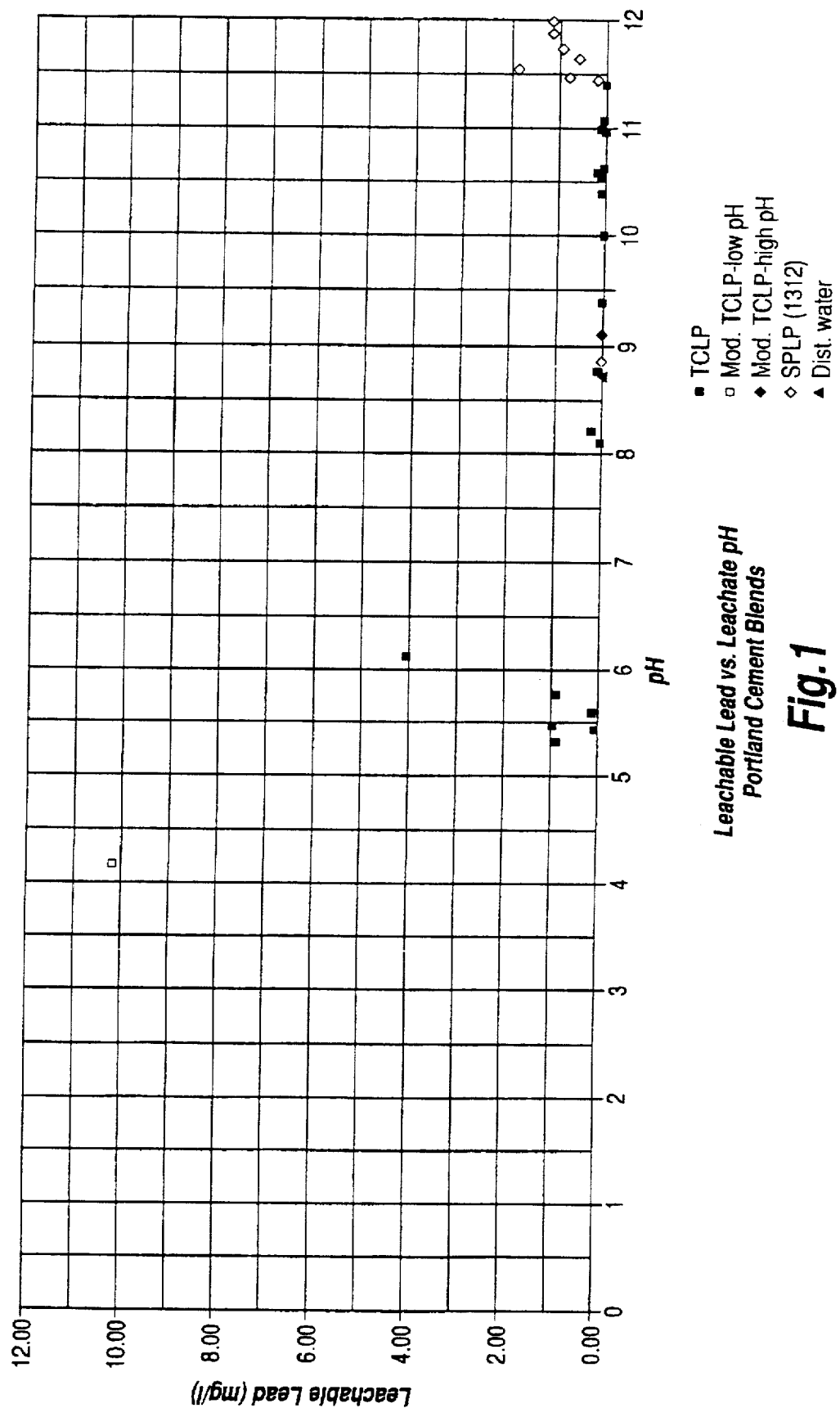

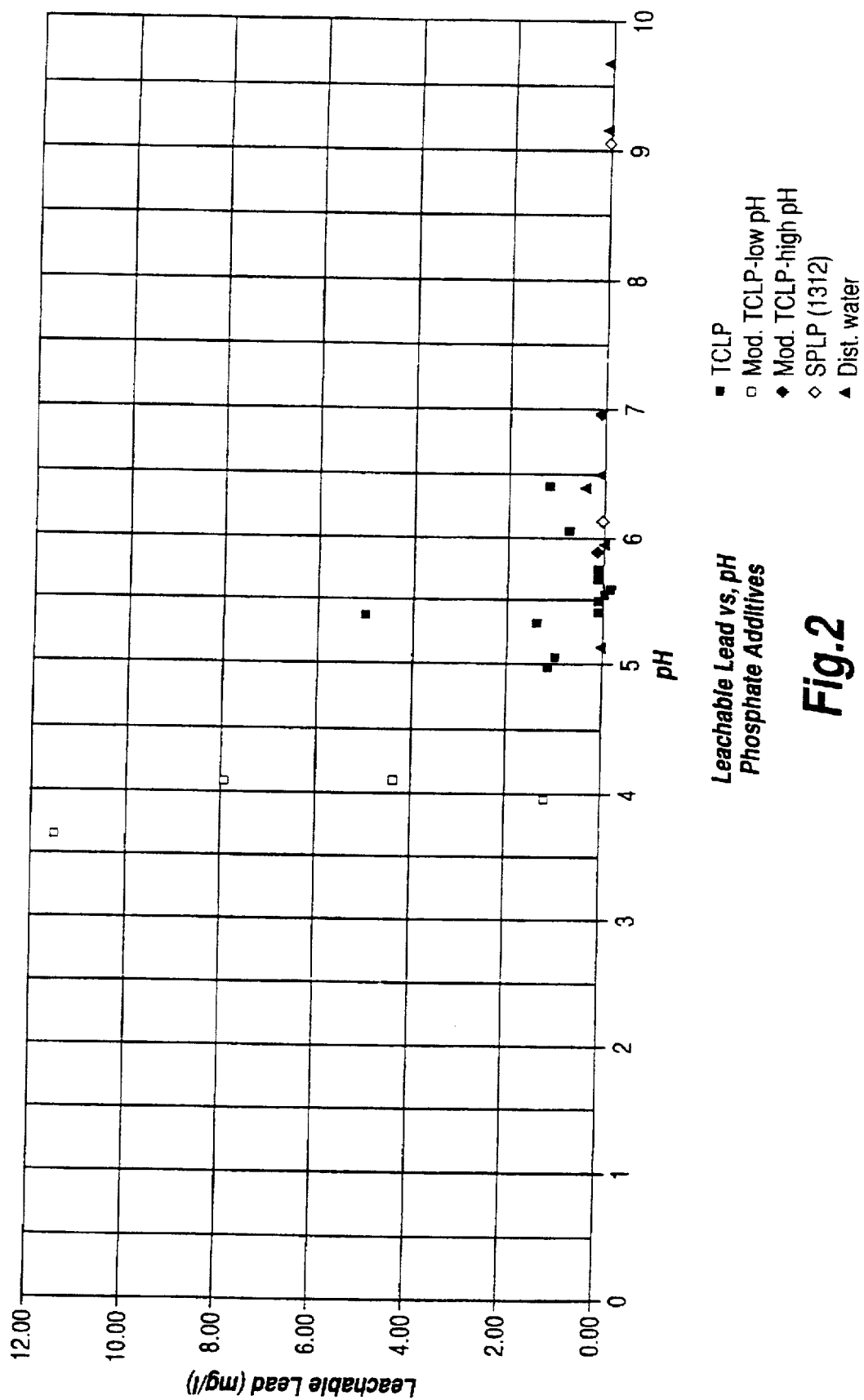

METHOD FOR TREATMENT OF SOLID WASTE TO MINIMIZE HEAVY METALS

This application is a continuation of application Ser. No. 08/389,356 filed Feb. 16, 1995, abandoned.

TECHNICAL FIELD

This invention relates to the treatment of contaminated materials, including soils and solids, and in particular to chemical treatment of waste or solids containing high levels of heavy metals, and in particular, lead, to control leaching of these heavy metals such that the metals will not leach at unacceptable levels into ground water under naturally occurring conditions.

BACKGROUND OF THE INVENTION

Over the past fifteen to twenty years, the potential dangers of hazardous waste, and in particular, heavy metals such as lead, arsenic, chromium, copper and cadmium, have been the subject of community pressure, public awareness and ever stricter regulatory control in order to reduce or eliminate the dangers to people directly and to the surrounding environment.

The leaching of heavy metals, and lead particularly, into ground water is a grave concern because of the danger that the drinking water supplies and the environment will become contaminated.

Solid wastes are classified as hazardous by the United States Environmental Protection Agency (U.S. EPA) pursuant to 40 C.F.R., Part 261. Any solid waste can be defined as hazardous either because it is "listed" in 40 C.F.R., Part 261 Subpart D or because it exhibits one or more of the characteristics of a hazardous waste as defined at Part 261, Subpart C. These characteristics are: (1) ignitability, (2) corrosivity, (3) reactivity, and (4) toxicity. The present invention is related to the reduction of the toxicity characteristic in solid waste. The toxicity characteristic (TC) is determined according to U.S. EPA regulations by performing a toxicity characteristic leaching procedure (TCLP) as specified in 40 C.F.R., Part 261, Appendix 2.

40 C.F.R., Part 261.24(a), contains a list of contaminants and their associated maximum allowable concentrations. If a contaminant, such as lead, exceeds its maximum allowable concentration then the material is classified as hazardous. In general, the TCLP test determines whether a solid waste has unacceptable levels of certain hazardous substances such as heavy metals which can be leached from the solid waste.

Waste containing leachable lead (Pb) is currently classified as hazardous waste due to the toxicity characteristic, if the level of lead extracted in a TCLP analysis is above 5.0 milligrams per litter (mg/L) or parts per millions (ppm).

Additionally, U.S. EPA land disposal restrictions prohibit the land disposal of solid wastes which leach in excess of these maximum allowable concentrations upon performance of the TCLP analysis. The land disposal regulations require that these wastes are treated until the heavy metals do not leach from the solid waste at levels above the maximum allowable concentrations prior to placement in a surface impoundment, waste pile, landfill or other land disposal unit as defined in 40 C.F.R. 260.10.

In addition, various states also have promulgated regulations which place special disposal requirements on solid waste which do not leach at concentrations that exceed the TC criteria but do leach above certain other criteria. For example, the State of Texas classifies solid wastes which leach lead between 1.5 mg/L and 5.0 mg/L under the TCLP analysis as a non-hazardous, Class 1 solid waste. Special disposal requirements are placed on these wastes which are more costly than if the TCLP results are less than the 1.5 mg/L. Therefore, the goal of solid waste treatment is often to obtain leaching results much lower than the hazardous criteria of 5.0 mg/L.

The TCLP test is designed to simulate a worst case leaching situation, that is leaching conditions which would typically be found in the interior of an actively degrading municipal landfill. Such landfills normally are slightly acidic with a pH of approximately 5±0.5. Additionally, the leaching medium is normally heavily buffered by volatile organic acids, for example acetic acid produced by the facultative anaerobic degradation of organic matter.

In addition, the TCLP analysis is infrequently the only test of concern. Many times, other criteria will actually be more important from the standpoint of simulating actual disposal conditions and insuring the permanence of the treatment. For example, the Synthetic Precipitate Leachate Procedure (U.S. EPA SW-846 Method 1312) was developed to simulate acid rain conditions and contains provisions for slightly different leachate solutions for sites located east and west of the Mississippi River to better simulate actual acid rain. Other leachate tests used to evaluate the leaching potential of solid waste include those using distilled or deionized water and site specific ground water or surface water for the leachant.

In addition, the American Nuclear Society's method 16.1, as modified for metals, is used to simulate the long-term leaching potential of metal bearing waste which has been stabilized and solidified into a monolith. This analysis is frequently utilized when the waste is being placed in subsurface saturated conditions with ground water monitoring and/or remediation requirements.

In addition to the TCLP leachate test requirements, structural design and regulatory requirements often place physical criteria on treated waste. The U.S. EPA has adopted 50 pounds/square inch, measured as unconfined compressive strength, as its general guidance for structural criteria to support a landfill cap.

In addition, if the treated waste is placed in a saturated or potentially saturated condition, a permeability specification may also be placed on the treatment design. For example, the State of Florida has imposed a maximum permeability criteria of $1 \times 10^{-6}$ cm/s on waste disposed of in subsurface saturated conditions. If the metal containing waste has a significant amount of sand or organic matter, then additives will be needed to obtain the required structural integrity.

This combination of criteria can pose a significant challenge for developing a specific treatment for a particular solid waste that will meet the regulatory criteria. For example, the traditional soil amendments which have been used for many physical requirements, i.e. lime or lime based products such as Portland Cement are highly alkaline. While such solid waste may meet the TC criteria when measured using the buffered acidic TCLP leachate solution, amphoteric substances such as lead may leach significantly if disposed of under more neutral conditions.

Unlike the present invention, prior art additives and mixtures for reducing the leachability of heavy metals, and in particular lead, have been unable to obtain these results with either the use of one additive only or with its combination with Portland Cement.

U.S. Pat. No. 5,202,033 describes an in-situ method for decreasing heavy metal leaching from solid waste using a combination of solid waste additives and additional pH controlling agents from the source of phosphate, carbonate, and sulfates.

U.S. Pat. No. 5,037,479 discloses a method for treating highly hazardous waste containing unacceptable levels of leachable metals such as lead by mixing the solid waste with a buffering agent selected from the group consisting of magnesium oxide, magnesium hydroxide, reactive calcium carbonates and reactive magnesium carbonates with an additional agent which is either an acid or salt containing an anion from the group consisting of Triple Superphosphate (TSP), ammonium phosphate, diammonium phosphate, phosphoric acid, boric acid and metallic iron.

U.S. Pat. No. 4,889,640 discloses a method and mixture for treating hazardous waste, including lead, by mixing the solid waste with an agent selected from the group consisting of reactive calcium carbonate, reactive magnesium carbonate and reactive calcium magnesium carbonate.

U.S. Pat. No. 4,652,381 discloses a process for treating industrial waste water contaminated with battery plant waste, such as sulfuric acid and heavy metals by treating the waste water with calcium carbonate, calcium sulfate, calcium hydroxide to complete a separation of the heavy metals. However, this is not for use in a landfill situation.

Unlike the present invention, however, none of the prior art solutions were able to utilize the waste itself in combination with a single additive either alone or with Portland Cement to produce a non-toxic landfill substance as defined by the TCLP.

SUMMARY OF THE INVENTION

Treatment of solid waste, for which the leachability of metals is the only concern, may be accomplished by addition of a substance which provides an anion with which the heavy metal reacts to form a relatively insoluble species, e.g. a salt, and provides assurance that the proper pH range is maintained for passing the TCLP analysis and allows minimal leaching under actual disposal conditions.

The present invention discloses a treatment through the addition of one additive substance, either alone or with Portland Cement, properly chosen to complement the waste constituency and therefore provide the appropriate chemical equilibrium needed to maintain the proper pH range. The present invention involves the treatment of hazardous and solid waste by the addition and mixing with one or more treatment additives chosen and tailored with consideration given to the chemical and physical regulatory criteria, soil and ground water chemistry of the disposal site, and the chemistry of the waste itself, in particular, pH.

Indeed, the present invention provides a method for the treatment of solid waste, and in particular, waste containing lead with one of the following additives: (1) phosphoric acid, (2) monocalcium phosphate (TSP), (3) monoammonium phosphate or (4) diammonium phosphate either alone or in combination with Portland Cement.

Any of these additives provides the following two important components to the waste mixture: (1) the phosphate ion which reacts with most heavy metals to form salts which are insoluble, and (2) the phosphoric acid buffer system which provides stability for the treated waste mixture under minor environmental changes.

BRIEF DESCRIPTION OF THE DRAWINGS

Other features and advantages of the invention will be apparent from the following detailed description of the invention when taken in conjunction with the following Detailed Description.

FIG. 1 is a graph of the leachable lead versus pH using a Portland Cement blend of the present invention; and FIG. 2 is a graph of the leachable lead versus pH using the additives of the present invention.

DETAILED DESCRIPTION

The present invention involves the treatment of solid waste by the addition and mixing with one or more treatment additives chosen by considering (1) the chemical and physical regulatory criteria; (2) the soil and ground water chemistry of the disposal site; and (3) the chemistry of the waste itself, in particular, its pH.

Depending on the pH of the waste itself, one of the following additives may be used alone or with Portland Cement to treat the waste: (1) phosphoric acid, (2) monocalcium phosphate also commonly available in a fertilizer grade as triple super phosphate or TSP, (3) monoammonium phosphate, or (4) diammonium phosphate. Any of the above particular additives provide the two necessary components for the waste mixture. One component is the phosphate ion which reacts with the metal, and in particular, lead to form a salt or mineral which is insoluble under normal environmental conditions, and (2) a phosphoric acid buffer system that provides stability to the treated waste mixture under minor environmental changes.

A buffer solution is one consisting of a weak acid and its conjugate base which resists pH changes when diluted or when various amounts of acid or base are added. Since orthophosphoric acid (hereinafter referred to as phosphoric acid), the root compound of the above-listed additives, is a polyprotic acid, it disassociates or ionizes in three steps involving the following-proton-transfer equilibria:

(1) $H_3PO_4 + H_2O \rightleftharpoons H_2PO_4^- + H_3O^+$  $K_1 = 7.5 \times 10^{-3}$  $pK_1 = 2.1$
(2) $H_2PO_4^- + H_2O \rightleftharpoons HPO_4^{2-} + H_3O^+$  $K_2 = 6.3 \times 10^{-8}$  $pK_2 = 7.2$
(3) $HPO_4^{2-} + H_2O \rightleftharpoons PO_4^{3-} + H_3O^+$  $K_3 = 4.8 \times 10^{-13}$  $pK_3 = 12.3$ In each of these ionization steps, the substance on the left side of the reaction arrow is the weak acid and the substance on the right is the conjugate base. Therefore, three separate buffer systems are available by the addition of phosphoric acid or of its derivative salts in an aqueous solution.

The chemical equilibria shifts with pH and the addition of other chemical species. In a pure phosphoric acid solution, however, at a pH of 4.6, the $H_2PO_4^-$ species totally dominates. At a pH of 7.2, the equilibrium shifts to ½ $H_2PO_4^-$ and ½ $HPO_4^{2-}$ and at a pH of 9.8, the species $H_2PO_4^-$ dominates. The maximum buffer capacity exists at the pH where equal concentrations of each species exists, or the pK value is 2.1 for reaction (1), 7.2 for reaction (2) and 12.3 for reaction (3).

Lead is known to be soluble at lower and higher pH ranges, therefore, theoretically the optimum pH of a phosphoric acid solution with lead would be 7.2. The chemical equilibria of such a system, however, is subject to many additional factors; therefore, the optimum final pH shifts with every mixture. Tables 1 through 9 show the compilation of leachable lead data obtained in several treatability studies from various waste sites. The solid waste samples tabulated in tables 2 and 3 are from secondary lead smelter residues having a relatively high pH. The solid waste samples tabulated in table 9 are from a battery manufacturing waste disposal site which is highly acidic and contains large amounts of sulfuric acid and lead.

Tables 1 through 9 show successful treatment of lead contaminated solid wastes by the addition of several phosphate additives by themselves and with the addition of Portland Cement added for soil stability. The Portland Cement used is preferrably as specified by ASTM C150. The data in Tables 1-9 also show the successful treatment of lead contaminated solid wastes by the addition of a single phosphate additive from the group consisting of phosphoric acid, monoammonium phosphate, calcium phosphate or TSP, either alone or in combination with Portland Cement used as a soil stabilizer.

Thus, in determining the soil physical and chemical characteristics and the proper additive for treatment of the solid waste, samples of the solid waste are used to perform the laboratory treatment tests. For example, in practicing the invention, the mix of the solid waste with the pH buffering agents must be sufficiently complete so that a random small sample, e.g. 100 grams of the waste mixture, will have sufficient agents to limit lead extraction to below 5.0 mg/l when the waste mixture is analyzed using the TCLP. For a specific solid waste, the appropriate ratio of agents to solid waste may be arrived at by experimentation with 100 gram samples of the waste having various percentages of the agents by weight as set forth in Tables 1-9. In general the percentage by weight of additives can range from 1% to 10% and the percentage by weight of the Portland Cement additive can range from 3% to 30%.

FIGS. 1 and 2 disclose the pH versus leachable lead content of the treated mixtures and indicate that once the orthophosphate system is introduced to the mixture, lead remains relatively insoluble in the pH range between 5.5 and 11.5. Thus, the final optimum pH which provides the maximum buffer for the solid wastes is likely between 7 and 10 and will usually be the design pH range for treatment of solid wastes containing lead.

TABLE 1

| Sample | TCLP pH | TCLP Lead |
| --- | --- | --- |
| Sample A - Untreated | 5.59 | 159.00 |
| A + 1% Phosphoric Acid | 5.37 | 5.00 |
| A + 0.5% Phos. Acid + 5% Portland Cement | 5.05 | 376.60 |
| A + 1% Phos. Acid + 5% Portland Cement | 4.98 | 104.60 |
| A + 0.5% Phos. Acid + 10% Portland Cement | 5.24 | 26.10 |
| A + 1% Phos. Acid + 10% Portland Cement | 6.12 | 4.00 |
| A + 1% Phos. Acid + 12% Portland Cement | 8.2 | 0.20 |
| A + 1% Phos. Acid + 20% Portland Cement | 10.39 | 0.08 |
| A + 1% Monoammonium Phospate | 5.6 | 67.70 |
| A + 1% Calcium Phosphate | 5.47 | 78.40 |

TABLE 1-continued

| Sample | TCLP pH | TCLP Lead |
| --- | --- | --- |
| Monobasic (TSP) | | |
| A + 3% TSP + 5% Portland Cement | 4.87 | 10.80 |
| A + 3% TSP + 10% Portland Cement | 5.76 | 0.88 |
| A + 3% TSP + 20% Portland Cement | 11 | 0.09 |

The data from Table 1 discloses that acceptable TCLP lead measurements are reached when the solid waste is mixed with one of the additives chosen from the group consisting of phosphoric acid and TSP when mixed with Portland Cement. The solid waste from Table 1 sample A is from a battery recycling facility. The percentage of phosphoric acid preferably is 1 percent by weight or greater and the percentage of Portland Cement is preferably ten percent by weight or greater. The percentage of TSP is preferably three percent by weight or greater.

TABLE 2

| Sample | TCLP pH | TCLP Lead |
| --- | --- | --- |
| Sample B - Untreated | 5.54 | 814.40 |
| B + 1% Phos. Acid | 6.4 | 1.13 |
| B + 1% Phos. Acid + 5% Portland Cement | 10.01 | <0.05 |
| B + 1% Phos. Acid + 20% Portland Cement | 10.98 | <0.05 |
| B + 3% TSP | 6.06 | 0.71 |
| B + 3% TSP + 5% Portland Cement | 8.1 | <0.05 |
| B + 3% TSP + 20% Portland Cement | 11.41 | <0.05 |

Table 2 discloses that the use of phosphoric acid either alone or in combination with Portland Cement results in acceptable TCLP lead characteristics. Table 2 also discloses the use of TSP either alone or in combination with Portland Cement achieves acceptable results. In Table 2 the percentage of phosphoric acid is preferably one percent by weight or greater and Portland Cement is 5% percent by weight or greater. The preferred TSP percentage is 3% by weight as shown in Table 2.

TABLE 3

| Sample | TCLP pH | TCLP Lead |
| --- | --- | --- |
| Sample C - Untreated | 5.41 | 314.40 |
| C + 3% Monoammonium phosphate (M.am.) | 5.74 | 0.09 |
| C + 1.5% M.am phos. + 1.5% sodium carbonate | 5.49 | 0.09 |
| C + 1.5% M.am phos. + 1.5% Portland Cement | 5.43 | 0.05 |
| C + 3% TSP | 5.41 | 0.06 |
| C + 1.5% TSP + 1.5% sodium carbonate | 5.67 | 0.11 |
| C + 1.5% TSP + 1.5% sodium carbonate | 5.59 | 0.11 |

Table 3 shows that solid waste mixtures containing (1) 3% percent by weight monoammonium phosphate, (2) 1½% by weight sodium carbonate and 1½% by weight monoammonium phosphate, (3) 3% by weight TSP (4) and (5) 1.5% by weight TSP and 1.5% by weight sodium carbonate are effective in treating solid wastes containing lead.

TABLE 4

| Sample | TCLP pH | TCLP Lead |
|---|---|---|
| Sample D - Untreated | 5.41 | 110.50 |
| D + 3% M.am.phos. | 5.04 | 0.97 |
| D + 1.5% M.am phos. + 1.5% sodium carbonate | 5.33 | 1.35 |
| D + 1.5% M.am phos. + 1.5% Portland Cement | 5.32 | 0.86 |
| D + 3% TSP | 4.97 | 1.12 |
| D + 1.5% TSP + 1.5% sodium carbonate | 5.32 | 1.36 |
| D + 1.5% TSP + 1.5% Portland Cement | 5.47 | 0.94 |

Table 4 illustrates once again the usefulness of the present inventions and specifically discloses monoammonium phosphate, sodium carbonate and Portland Cement combinations that achieve acceptable lead leaching characteristics. Table 4 shows that the following additives prevent lead from leaching at unacceptable levels: (1) 3% by weight monoammonium phosphate, (2) 1.5% by weight monoammonium phosphate and 1.5% by weight sodium carbonate, (3) 1.5% by weight monoammonium phosphate and 1.5% by weight Portland Cement, (4) 3% by weight TSP, (5) 1.5% by weight TSP and 1.5% by weight sodium carbonate and (6) 1.5% by weight TSP and 1.5% by weight Portland Cement.

TABLE 5

| Sample | TCLP pH | TCLP Lead |
|---|---|---|
| A + 1% Phos. Acid + 10% Portland cement | 6.12 | 4.00 |
| A + 1% Phos. Acid + 12% Portland cement | 8.2 | 0.20 |
| A + 1% Phos. Acid + 20% Portland cement | 10.39 | 0.08 |
| A + 3% Phos. Acid + 10% Portland cement | 5.76 | 0.88 |
| A + 3% TSP Phos. Acid + 20% Portland cement | 11 | 0.09 |

Table 5 discloses that the combinations of (1) phosphoric acid and Portland Cement and (2) TSP and Portland Cement are effective in treating lead containing solid wastes.

TABLE 6

| Sample | TCLP pH | TCLP Lead |
|---|---|---|
| B + 1% Phos. Acid + 5% Portland cement | 10.01 | 0.03 |
| B + 1% Phos. Acid + 20% Portland cement | 10.98 | 0.03 |
| B + 3% TSP + 5% Portland cement | 8.1 | 0.03 |
| B + 3% TSP + 20% Portland cement | 11.41 | 0.03 |

Table 6 shows the effective treatment of lead containing solid wastes with (1) phosphoric acid and Portland Cement and (2) TSP and Portland Cement.

TABLE 7

| Sample | TCLP pH | TCLP Lead |
|---|---|---|
| C + 1.5% M.am. phos. + 1.5% Portland cement | 5.43 | 0.05 |
| C + 1.5% TSP + 1.5% Portland cement | 5.59 | 0.11 |

Table 7 shows the effective treatment of lead containing solid wastes with (1) monoammonium phosphate and Portland Cement and (2) TSP and Portland Cement.

TABLE 8

Treatment Data - Portland Cement and Phosphate Additives

| Sample | TCLP pH | TCLP Lead |
|---|---|---|
| D + 1.5% M.am. phos. + 1.5% Portland cement | 5.32 | 0.86 |
| D + 1.5% TSP + 1.5% Portland cement | 5.47 | 0.94 |

Table 8 shows the effective treatment of lead containing solid wastes with (1) monoammonium phosphate and Portland Cement and (2) TSP and Portland Cement. The waste sample D of Table 8 is from a battery manufacturing site.

TABLE 9

| Parameter | Untreated | Treated A | Treated B | Treated C | 15-5A | 12-3A | 12-5A |
|---|---|---|---|---|---|---|---|
| pH1 | 6.33 | 10.74 | 10.77 | 10.86 | 11.39 | 11.4 | 11.36 |
| pH2 | 3.14 | 8.35 | 8.62 | 6.4 | 6.50 | 9.08 | 6.71 |
| Final pH | 6.18 | 5.99 | 5.89 | 5.78 | 5.66 | 5.27 | 5.27 |
| Arsenic (mg/l) | 0.05 | <0.03 | 0.09 | 0.03 | 0.021 | 0.024 | 0.027 |
| Cadium (mg/l) | 0.011 | <0.01 | <0.01 | <0.01 | 0.01 | 0.01 | 0.01 |
| Chromium (mg/l) | <0.03 | <0.03 | <0.03 | <0.03 | 0.01 | 0.01 | 0.01 |
| Lead (mg/l) | 10.2 | 2.19 | 2.29 | 1.19 | 0.10 | 0.36 | 0.16 |
| Calcium (mg/l) | 597.7 | 2,087.7 | 2,152.8 | 2,224.9 | 1,948.0 | 1,778.9 | 1,836.3 |
| Phosphorous (mg/l) | 0.1 | 1.9 | 2 | 2.2 | 36.9 | 32.6 | 55.7 |
| P added (g) | 0 | 0.454 | 0.454 | 0.454 | 0.744 | 0.466 | 0.763 |
| CaO added (g) | 0 | 7.3 | 7.3 | 7.3 | 7.46 | 6.08 | 6.27 |

Turning to Table 9, therein is disclosed a treatability study of a battery recycling waste site. The TCLP procedure was performed on the untreated sample with the leachate analyzed for arsenic, cadmium, chronimum, lead, calcium, and phosphorus. The results are tabulated in Table 9. The untreated sample leached arsenic at 0.05 mg/l. The treated samples show the results of less than 0.03, 0.09, and 0.03 mg/l and, thus, show no decrease in leachable arsenic on the average.

Lead leached from the untreated samples at a constant concentration of 10.2 mg/l. The treated samples leached lead at concentrations of 2.19, 2.29 and 1.19 mg/l which were well below the criteria of 5.0 mg/L. This shows an average reduction of leachable lead of 81%. The treatment samples A, B and C were a combination of 15% by weight Portland Cement and 3% by dry weight TSP.

It should be noted that due to the nature of the TCLP procedure, different leachate solutions were used on the untreated and treated samples. The pH noted as pH2 in Table 9 is the pH which determines whether to use TCLP Extraction Fluid No. 1 or Extraction Fluid No. 2. If pH2 is less than 5.0, Extraction Fluid No. 1 is used as the leachant. Sodium hydroxide is added during preparation of that solution which neutralizes much of the acidity so that it only contains approximately 0.7 meq free hydrogen ions per gram sample and has a pH of 4.93±0.05. If pH2 is greater than 5.0, then Extraction Fluid No. 2 having a pH of 2.8±0.05 and containing two meq hydrogen ions/per gram (h+/gram) of sample, is used as the leachant as indicated by the data on Table 9.

Therefore, Extraction Fluid No. 1 was used for the untreated samples but Extraction Fluid No. 2 was required for the treated samples. This made the results from the procedure on the treated samples more rigorous.

In an attempt to further gather information regarding how variations in the phosphate and Portland Cement percentages affected the leachable lead level, samples were analyzed using three additional formulas. Additional samples were treated with (1) 15% by dry weight Portland Cement and 5% by dry weight TSP-(15-5A); (2) 12% by dry weight Portland Cement and 3% by dry weight TSP (12-3A) and (3) 12% by dry weight Portland Cement and 5% by dry weight TSP.

The two percent of additional TSP significantly lowered the leachable lead concentrations. Reducing the percentage of Portland Cement while keeping the same percentage of phosphate also reduced leachable lead. In that case, the total additive ratio is less so the total phosphate additive is slightly more than the 15-3 mix of samples A, B and C. The lesser amount of free lime allows the pH to come down very slightly causing the lead solubility to move down the solubility curve. A combination of the total amounts of additive per 100 grams of TCLP sample is disclosed at the bottom of Table 9 to facilitate the comparison of all the factors.

The treatability ratios of Tables 1 through 9 disclose that agents of phosphoric acid, monoammonium phosphate, diammonium phosphate and TSP either alone or in combination with Portland Cement can be used to reduce extractable lead in solid waste to U.S. EPA acceptable criteria.

It is understood that the invention is not confined to the particular process disclosed herein; nor to the materials and substances described, but embraces such modified forms thereof as come within the scope of the following claims.

I claim:

1. A method of treating solid hazardous waste containing unacceptable levels of leachable metals, the method comprising the step of mixing the solid waste with at least one agent selected from the group consisting of phosphoric acid, monocalcium phosphate, monoammonium phosphate, or diammonium phosphate and adding Portland Cement in sufficient quantities such that the mixture will have an optimum pH range between 5.5 and 11.5 so that under both acidic and non-acidic leaching conditions the metals in the mixture will be converted to substantially non-leachable forms.

2. The method of claim 1 wherein the solid waste and agents are mixed into a mixture with sufficient quantities of each of the agents so that a random 100 gram sample of the mixture will have sufficient agents to limit leachable metal extraction to below 5.0 mg/l when analyzed with the toxicity characteristic leaching procedure.

3. The method of claim 1 wherein the leachable metal is lead.

4. The method of claim 1 wherein the Portland Cement is added in sufficient quantities such that the mixture will have an optimum pH range between about 7 and 10.

5. A non-hazardous solid waste mixture which may be safely disposed of in a landfill comprising a solid hazardous waste containing unacceptable levels of leachable metals mixed with at least one first agent selected from the group of phosphoric acid, monocalcium phosphate, monoammonium phosphate, or diammonium phosphate and adding Portland Cement in quantities sufficient such that the mixture will have an optimum pH range between 5.5 and 11.5 so that under both acidic and non-acidic leaching conditions the metals will be converted to substantially non-leachable forms.

6. The non-hazardous solid waste mixture in accordance with claim 5 wherein there is sufficient quantity of each of the agents incorporated into the mixture so that when a random 100 gram sample of the mixture is analyzed by the toxicity characteristic leaching procedure, leachable metal is extracted at a level below 5.0 mg/L.

7. The non-hazardous solid waste mixture in accordance with claim 5 wherein the leachable metal is lead.

8. The non-hazardous solid waste mixture in accordance with claim 5 wherein sufficient quantities of Portland Cement are added to the solid hazardous waste such that the mixture will have an optimum pH range between about 7 and 10.

* * * * *